US010457086B2

(12) United States Patent
Jones et al.

(10) Patent No.: US 10,457,086 B2
(45) Date of Patent: Oct. 29, 2019

(54) EMBEDDED VARIABLE LINE PATTERNS

(71) Applicant: MorphoTrust USA, LLC, Billerica, MA (US)

(72) Inventors: Robert L. Jones, Andover, MA (US); Yecheng Wu, Lexington, MA (US)

(73) Assignee: MorphoTrust USA, LLC, Billerica, MA (US)

( * ) Notice: Subject to any disclaimer, the term of this patent is extended or adjusted under 35 U.S.C. 154(b) by 0 days.

(21) Appl. No.: 15/858,958

(22) Filed: Dec. 29, 2017

(65) Prior Publication Data

US 2018/0186167 A1 Jul. 5, 2018

Related U.S. Application Data

(60) Provisional application No. 62/440,701, filed on Dec. 30, 2016.

(51) Int. Cl.

| | |
|---|---|
| ***G06K 19/06*** | (2006.01) |
| ***B42D 25/355*** | (2014.01) |
| ***B42D 25/485*** | (2014.01) |
| ***B42D 25/23*** | (2014.01) |
| ***B42D 25/305*** | (2014.01) |
| ***B42D 25/309*** | (2014.01) |

(52) U.S. Cl.
CPC ........... *B42D 25/355* (2014.10); *B42D 25/23* (2014.10); *B42D 25/305* (2014.10); *B42D 25/309* (2014.10); *B42D 25/485* (2014.10)

(58) Field of Classification Search
CPC ....... G06K 19/06056; G06K 19/06103; G06K 19/08; G06K 19/083; G06K 19/10; G06K 19/18; G06Q 20/4014; G06Q 20/40145; G06Q 20/409; G06Q 20/4093; B42D 25/23; B42D 25/30; B42D 25/309
See application file for complete search history.

(56) References Cited

U.S. PATENT DOCUMENTS 4,629,215 A * 12/1986 Maurer .................... B41M 3/14 283/94
5,410,642 A 4/1995 Hakamatsuka et al.
(Continued)

OTHER PUBLICATIONS

International Search Report and Written Opinion in International Application No. PCT/US2017/069043, dated Mar. 1, 2018, 11 pages.

(Continued)

*Primary Examiner* — Thien M Le
*Assistant Examiner* — April A Taylor
(74) *Attorney, Agent, or Firm* — Fish & Richardson, P.C.

(57) ABSTRACT

A system is capable of generating identifications that include distinctive line patterns corresponding to different portions of secure customer information. In some implementations, data indicating one or more linear patterns and data indicating customer information to be embedded within an identification document is obtained. Respective subsets of the customer information are assigned to each of the one or more linear patterns. A photographic image to be included within the identification document is then modified based at least on generating a portion of the photographic image that is composed of at least one of the one or more linear patterns. The modified photographic image is then disposed on an identification document to yield embedded customer information.

20 Claims, 6 Drawing Sheets

(56) References Cited

U.S. PATENT DOCUMENTS

| | | | | |
|---|---|---|---|---|
| 5,761,686 | A | 6/1998 | Bloomberg | |
| 6,210,777 | B1 | 4/2001 | Vermeulen et al. | |
| 7,043,052 | B2 | 5/2006 | Rhoads | |
| 7,789,311 | B2 * | 9/2010 | Jones | G06K 7/1417 235/487 |
| 8,783,580 | B2 * | 7/2014 | Lesur | B42D 25/405 235/494 |
| 9,390,460 | B2 | 7/2016 | Caton et al. | |
| 2003/0116630 | A1 | 6/2003 | Carey et al. | |
| 2004/0049401 | A1 | 3/2004 | Carr et al. | |
| 2004/0250142 | A1 | 12/2004 | Feyler | |
| 2005/0109850 | A1 | 5/2005 | Jones | |
| 2006/0171558 | A1 | 8/2006 | Alattar et al. | |
| 2008/0301464 | A1 | 12/2008 | Parkinson | |
| 2010/0295289 | A1 | 11/2010 | Doublet et al. | |
| 2011/0266348 | A1 | 11/2011 | Denniston, Jr. | |
| 2013/0301870 | A1 * | 11/2013 | Mow | G06T 1/0021 382/100 |
| 2015/0151562 | A1 | 6/2015 | Whiteman et al. | |

OTHER PUBLICATIONS

Al-Hamami et al., "A New Approach for Authentication Technique", Journal of Computer Science, 1 (1): 103-106, 2005.

International Search Report and Written Opinion in International Application No. PCT/US2017/060926, dated Jan. 16, 2018, 8 pages.

* cited by examiner 300 302 304 306 314

| ENCODED DATA | EXAMPLE BINARY DATA | EXAMPLE LINE CODE |
|---|---|---|
| 0 | 11000 | |
| 1 | 00011 | |
| 2 | 00101 | |
| 3 | 00110 | |
| A | 01001 | |
| B | 01010 | |
| C | 01100 | |
| A3 | 01001 00110 | |
| ... | ... | ... |

308

| | |
|---|---|
| — | 1-bit (on) |
| – | 0-bit (off) |

EMBEDDED VARIABLE LINE PATTERNS

FIELD

The present specification is related to physical and digital identifications.

BACKGROUND

User identifications such as driver licenses can be issued either as physical identification cards or digital identifications. A physical identification card is issued by creating a card that includes customer information, whereas a digital identification is issued in an electronic format and accessed on a client device. Both physical and digital identifications are commonly used for verifying the identity of an individual, providing access to restricted areas, or authorizing an individual to purchase age-restricted content.

SUMMARY

Identifications are provided to customers by issuing authorities such as government agencies or companies during an issuance process. Such identifications include customer information that is used to identify the identity of the customer, and in some instances, provide access or privileges to the customer. However, security features for physical identification cards or digital identifications are often pre-configured during the issuance process and unable to be adjusted after issuance. As a result, such identifications are often susceptible to risk of fraud and counterfeiting when the pre-configured security features become compromised. In addition, besides the use of a unique identification number, many issued identifications often include general security features (e.g., holographic images, pre-configured background patterns) that are applicable to a general population of users that have been issued the same identification.

In some implementations, a system is capable of generating identifications that include distinctive line patterns corresponding to different portions of secure customer information. For example, the system may construct or modify photographic images of an identification, such as a customer photo, a background pattern, or a portion of text, using line patterns that include different line thicknesses and line spacings. The system can then associate each line pattern with a corresponding portion of secure customer information. The system can also place multiple line patterns in different regions of the photographic images within the identification.

The system can also verify the authenticity of an identification based on determining the validity of the secure customer information associated with each line pattern. For example, the system can verify the presence of verified line patterns within an identification, verify a verified arrangement of the distinctive line patterns within the identification, or both. Once the identification has been issued, the system can detect the embedded line patterns within the identification in order to identify the corresponding secure customer information. In some instances, the identified secure customer information can also be used to authenticate the customer during an electronic transaction where the identification is provided to claim a user identity.

In some implementations, the system can periodically adjust the line patterns that are included within an identification. For example, the line patterns included within a physical identification card can be adjusted each time a new physical identification is issued. For digital identifications, the system can periodically reconstruct photographic image s of the digital identification in order to adjust the line patterns included within the digital identification. These adjustments can then be used to identify prior instances of identifications that have become invalid (e.g., through a detection of an expired line pattern), or represent a fraudulent or unauthorized use of an expired identification.

The line patterns embedded within the identification may or may not be visible to the human eye. In some implementations, the line patterns can be made large enough to enable manual verification using human eyes. In other implementations, the line patterns can be constructed to be small enough such that the graphic elements are visible to the human eye, but the embedded line patterns appear invisible. In such implementations, the line patterns can be detected using a detector device that uses specific optical scanning techniques to detect the embedded line patterns. In some implementations, a combination of eye-detectable and machine-readable line patterns can be included in order to improve the security features of the identification.

One aspect of the subject matter described in this specification can be embodied in an identification document including: a photographic image of an individual associated with the identification document, at least a portion of the photographic image comprising one or more linear patterns comprising one or more line segments; and customer information embedded within the photographic image, the customer information comprising respective subsets of the customer information that are assigned to each of the one or more linear patterns; wherein at least a portion of a line segment of a line pattern corresponds to binary data configured to be interpreted by a processing unit of a computer.

These and other implementations can each optionally include one or more of the following features. For example, in some implementations, the one or more linear patterns include: a first line segment having a first thickness; a second line segment having a second thickness greater than the first thickness. In some implementations, the one or more linear patterns include: a first line segment having a dashed line pattern with a first spacing distance; and a second line segment having a dashed line pattern with a second spacing distance greater than the first spacing distance. In some implementations, the one or more linear patterns include: a first line segment having a dashed line pattern; and a second line segment having a solid pattern. In some implementations, customer information includes secure customer information for verifying the authenticity of the identification document. In some implementations, the photographic image is a dithered monochrome image that comprises a plurality of lines to identify an individual associated with the identification document. In some implementations, each of the one or more linear patterns are assigned to different subsets of the customer information embedded within the photographic image.

One aspect of the subject matter described in this specification can be embodied in a computer-implemented method for making an identification document with a photographic image with embedded customer information. The method includes: obtaining (i) data indicating one or more linear patterns, and (ii) data indicating customer information to be embedded within an identification document; assigning respective subsets of the customer information to each of the one or more linear patterns; modifying a photographic image to be included within the identification document based at least on generating a portion of the photographic image that is composed of at least one of the one or more linear patterns; and disposing the modified photographic image on an identification document to yield embedded customer information.

These and other implementations can each optionally include one or more of the following features. For example, in some implementations, the one or more linear patterns comprise: a first line segment having a first thickness; a second line segment having a second thickness greater than the first thickness. In some implementations, the one or more linear patterns comprise: a first line segment having a dashed line pattern with a first spacing distance; and a second line segment having a dashed line pattern with a second spacing distance greater than the first spacing distance. In some implementations, the method further includes: receiving, from a customer device, data indicating a claimed identification document; identifying a customer identity associated with the claimed identification document; obtaining verification data for the customer identity, the verification data indicating one or more linear patterns within a graphical image of a valid identification document for the customer identity; and verifying an authenticity of the claimed identification document based on received data indicating the claimed identification document, and the obtained verification data for the customer identity.

In some implementations, verifying the authenticity of the claimed identification document includes: determining that a corresponding photographic image of the claimed identification document does not include at least one of the one or more linear patterns within the graphical image of the valid identification document; and in response to determining that a corresponding photographic image of the claimed identification document does not include at least one of the one or more linear patterns within the graphical image of the valid identification document, determining that the claimed identification document is not valid.

In some implementations, the obtained verification data for the customer identity indicates a particular arrangement of the one or more linear patterns within the photographic image of the valid identification document for the customer identity, and verifying the authenticity of the claimed identification document includes: determining that an arrangement of the one or more linear patterns within a corresponding photographic image of the claimed identification document does not correspond to the particular arrangement of the one or more linear patterns within the photographic image of the valid identification document for the customer identity; and determining that an arrangement of the one or more linear patterns within a corresponding photographic image of the claimed identification document does not correspond to the particular arrangement of the one or more linear patterns within the photographic image of the valid identification document for the customer identity, determining that the claimed identification document is not valid.

In some implementations, the method further includes: receiving, from a customer device, an authentication request for a customer transaction, the authentication request including the claimed identification document; identifying one or more line patterns of a photographic image included within the claimed identification document; determining respective subsets of the customer information that are assigned to each of the one or more line patterns of the photographic image included within the claimed identification document; and verifying a customer identity associated with the authentication request based on determining the respective subsets of the customer information assigned to each of the one or more line patterns.

In some implementations, modifying a photographic image to be included within the identification document comprises: adjusting a line segment within a portion of the photographic image to encompass a line pattern from among the one or more line patterns, and the adjusted line segment is invisible to the human eye. In some implementations, modifying a photographic image to be included within the identification document comprises generating a second photographic image for the photographic image to be included within the identification document, wherein the second photographic image comprises line segments that encompass the one or more line patterns in different regions of the second photographic image.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

Figure 1A:
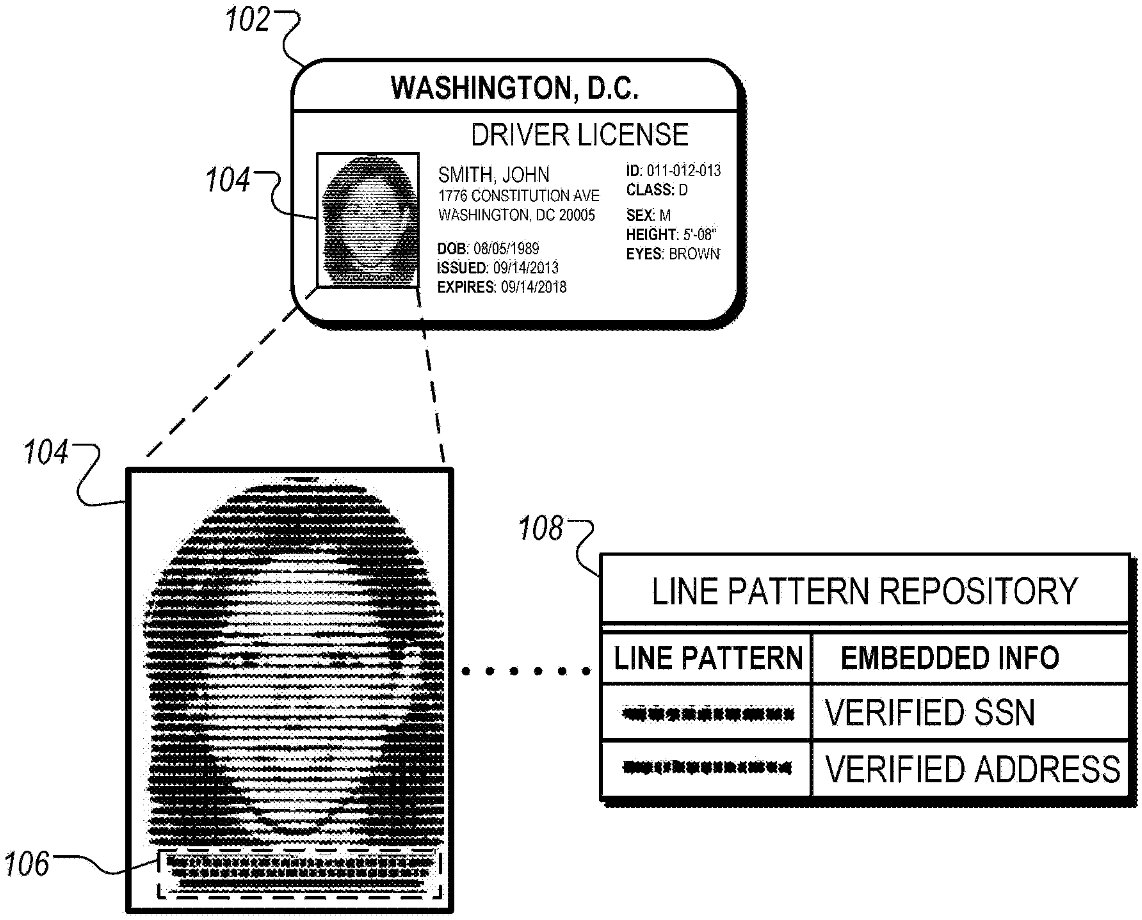
FIG. 1A illustrates an example of a physical identification with line patterns embedded within a photograph.

In general, a system is capable of generating identifications that include distinctive line patterns corresponding to different portions of secure customer information. For example, the system may construct photographic image s of an identification, such as a customer photo, a background pattern, or a portion of text, using different line thicknesses and line spacings. The system can then associate each line pattern with a corresponding portion of secure customer information. The system can also place multiple line patterns in different regions of the photographic image s within the identification.

The system can either verify the authenticity of an identification by determining the validity of the secure customer information associated with each line pattern, verifying the arrangement of the distinctive line patterns within the identification, or both. For instance, once the identification has been issued, the system can detect the embedded line patterns within the identification in order to identify corresponding secure customer information. The secure customer information can then be used to authenticate the customer.

A "customer" may refer to a user or individual. For example, a customer may be an individual with a physical identification card that may be a driver's license issued by a department of motor vehicles of a territory or a municipality. In other instances, the identification card may be other types of identifications such as a social security card, a passport, a birth certificate, or other government or company-issued identification cards.

A customer may be provided with a digital identification by enrolling into a digital identification program offered by a digital identification administrator. In some instances, the digital identification administrator may also be the issuing authority. In other instances, the digital identification administrator may be another organization that is authorized by the issuing authority to manage the issuance and maintenance of identification cards.

A customer may opt to enroll into the digital identification program using various methods such as, for example, an online enrollment process, a form submission, or through an oral agreement with an authorized representative. The digital identification administrator may then create a customer entry including customer information in a digital identification database. For instance, the customer information may include one or more of an email address, an identification number, a customer photograph, and other types of demographic information (e.g., home address) associated with the customer. The digital identification database may also indicate to the digital identification administrator that an entry for the customer has been successfully created once the entry for the customer has been created.

The enrollment process for the digital identification program may include the use of various methods to receive customer information, such as, for example, the use of email, the use of a customer token such as a personal identification number (PIN), and/or the use of customer biometric parameters.

FIG. 1A illustrates an example of a physical identification with line patterns embedded within a customer photograph. In the example, an identification 102 includes a customer photograph 104 with embedded line patterns 106. The customer photograph 104 is constructed such that different regions of the photograph are outlined with different patterns.

The customer photograph 104 can be represent different types of images. In some instances, the customer photograph 104 can be a color or grayscale photograph of an individual that is associated with the identification 102. In such instances, the customer photograph 104 may be captured by an issuing authority during an issuance process of the identification 102. In other instances, the customer photograph 104 can be a processed and/or adjusted format of a captured photograph of an individual. For instance, as illustrated in FIG. 1A, the customer photograph 104 can be a dithered image that includes a particular dithering pattern that identifies the individual within the customer photograph 104. The dithering pattern may be generated based on processing an input image of the individual using a dithering matrix. For example, a dithering matrix can be used to generate a dithering pattern with parallel horizontal lines as illustrated in FIG. 1. In other examples, other types of dithering patterns may also be used (e.g., vertical parallel lines, diagonal parallel lines, waves, etc.).

Although the figure illustrates line patterns being embedded within a physical identification, in other instances, the line patterns 106 can also be embedded within a digital identification (e.g., a digitally issued driver license). In addition, although the example depicted illustrates visibly detectable line patterns (e.g., visible to a human eye), in other instances, the line patterns can be constructed small enough to appear invisible to the human eye. In such instances, the line patterns can outline micro-features of the customer photograph 104 (or other portions of the identification 102).

Each of the line patterns 106 are distinctive from one another based on their line attributes. Examples of line attributes can include the spacing of line segments within a pattern line, the thickness of the pattern line, the color of the pattern line, among others. As described above, the line pattern is also associated with a portion of secure customer information. The secure customer information can be identified within a line pattern repository 108 that includes mappings between each line pattern and corresponding secure customer information. As depicted, the line pattern **106*a* is mapped to a verified social security number, the line pattern 106*b* is mapped to a verified customer address, and the line pattern 106*c*** is mapped to an authenticity identifier.

The detection of the line patterns 106 and associated secure customer information can be used to verify the authenticity of the identification 102. As an example, verification data for the identification 102 can specify the line patterns 106, the arrangement of the line patterns 106 within the customer photograph 104, and/or the associated credential information included within the line pattern repository 108. In this example, a detector device may compare detection data obtained from an identification presented by a customer to the verification data for the identification 102. For instance, if the detector device fails to detect each of the line patterns 106, or detects an incorrect arrangement of the line patterns 106 within the customer photograph 104, then the detector device may determine that there may be likelihood that the presented identification may be fraudulent.

In another example, secure customer information obtained from the detected line patterns of a presented identification can be used to authenticate a customer in addition to the credential information specified by the identification (e.g., name, date of birth, address, etc.). In this example, line patterns can be included and/or embedded within the identification to securely authenticate a customer without exposing sensitive secure customer information that is not displayed on the identification 102 (e.g., social security number). In this regard, line pattern detection can be used to securely verify sensitive customer information.

Figure 1B:
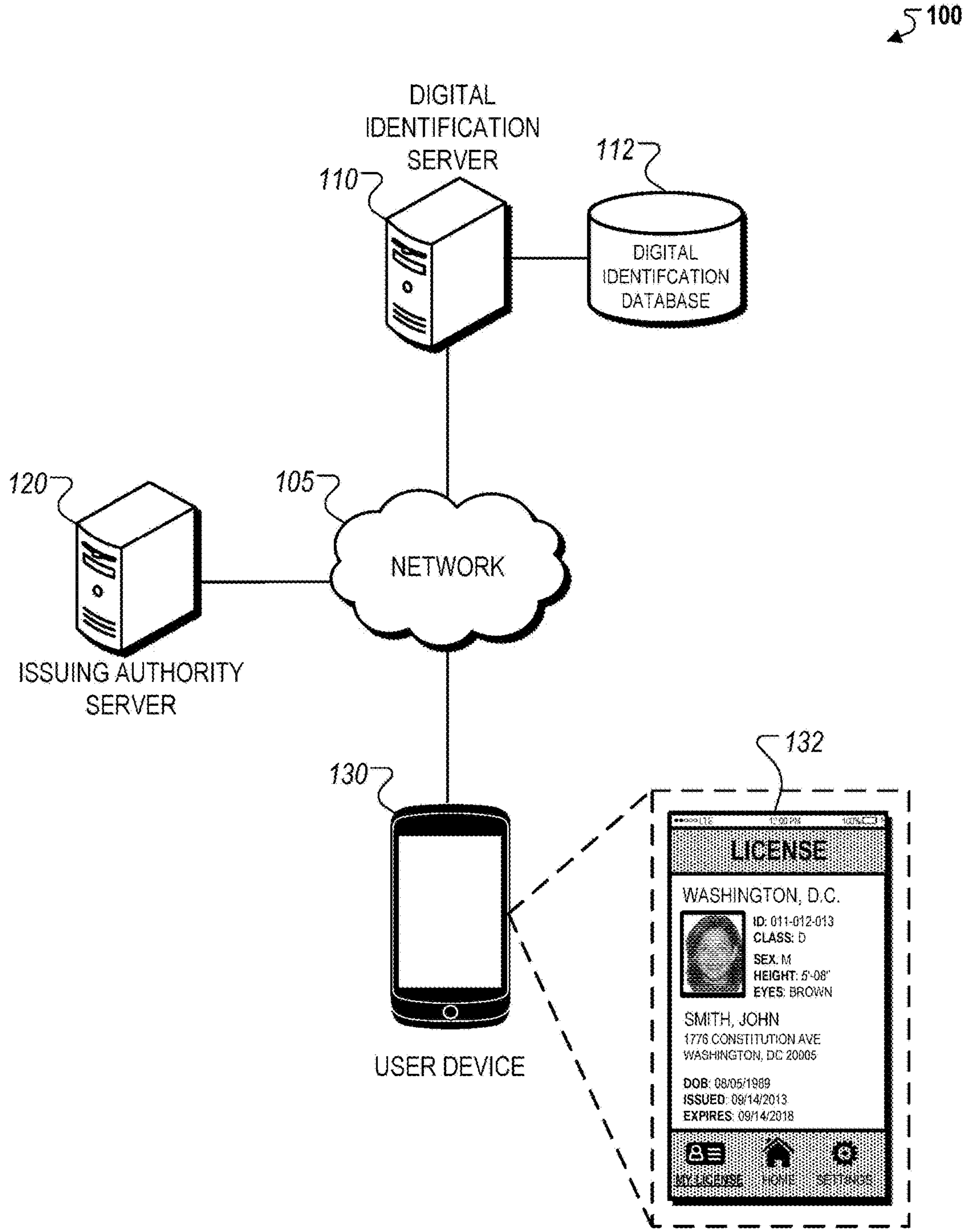
FIG. 1B illustrates an example of a system that generates digital identifications with embedded line patterns.

FIG. 1B illustrates an example of a system 100 for generating digital identifications that include line patterns for embedding data. In general, the system 100 may be used for various processes associated with a digital identification 132 (e.g., line pattern detection as described previously with respect to FIG. 1A). In addition, the system 100 may be used to initially enroll customers into a digital identification program, and provision a digital identification 132 to enrolled customers.

Briefly, the system 100 may include a digital identification server 110, an issuing authority server 120, and a customer device 130 connected over a network 105. The digital identification server 110 may also be configured to exchange communications with a digital identification database 112. In addition, the customer device 130 may display a digital identification 132 on a user interface presented to a customer (e.g., a customer or any other authorized user) on the customer device 130. Although the digital identification 132 is depicted as a digital driver license in FIG. 1B, the digital identification 132 may alternatively be a digital form of any physical identification card issued to a customer from various types of identification issuing authorities (e.g., a government agency or a company).

In general, the system 100 can be used to include line patterns within the digital identification 132 and/or assign portions of secure customer information to each of the line patterns included within the digital identification 132. As described above, the line patterns can be included to enable the system 100 to verify the authenticity of an identification presented by a customer and/or authenticate the customer based on extracting assigned credential information for each line segment.

For example, during an issuance process of the digital identification 132, the digital identification server 110 may initially generate one or more line segments to include within the newly generated digital identification 132. The digital identification server 110 may then obtain verified credential information stored within a customer record of the digital identification database 112 and associate portions of the verified credential information with each of the generated line segments. The verified credential information can include data collected and vetted by a government entity (e.g., department of motor vehicles).

Once the digital identification server 110 associates the line patterns with portions of the verified credential information, the digital identification server 110 may then generate a line pattern repository and store it within the digital identification database 112. The digital identification server 110 may also generate a new digital identification including designated line segments for issuance. After the digital identification 132 has been issued to the customer, the data included within stored line pattern repository can be used to identify the line patterns and/or the line pattern arrangement that is expected to be included within a verified copy of identification 132.

Additionally or alternatively, information contained within the line pattern repository can be used to generate time-variant representations of the digital identification 132. For example, the line pattern repository may specify a time-limited combination of line patterns included within the digital identification 132 and corresponding credential information for each line pattern. In such implementations, the line pattern combination may be periodically changed by the digital identification server 110 in order to increase the security of the digital identification 132. For example, if a customer transaction includes a digital identification with an expired line pattern combination (e.g., from a prior configuration), then the digital identifications server 110 may determine that the included digital identification may be a counterfeit identification.

Referring now to the individual components of the system 100, the network 105 may be configured to enable electronic communications between the digital identification server 110, the issuing authority server 120, and the customer device 130. For instance, the network 105 may include Local Area Networks (LANs), wide area networks (WANs), Wi-Fi, or analog or digital wired and wireless networks. The network 105 may include multiple networks or subnetworks, each of which may include, for example, a wired or wireless data pathway. The network 105 may also include a circuit-switched network, a packet-switched data network, or any network capable of carrying electronic communications (e.g., data or voice communications). For example, the network 105 may include networks based on the Internet Protocol (IP), or other comparable technologies.

The digital identification server 110 may be a remote server that is monitored and operated by an organization or institution that is authorized by an identification issuing authority to provide the digital identification 132 to a customer. In some instances, the organization or institution operating the digital identification server 110 may be an organization that is designated by the identification issuing authority to access identification information for a plurality of customers who have been issued a physical identification card. In other instances, the organization or institution operating the digital identification server 110 may be the identification issuing authority (e.g., a government institution) that issues a plurality of customers with a physical identification card.

The digital identification server 110 may coordinate and administer the backend processes that are involved in provisioning a digital identification to the plurality of customers that have been issued a physical identification from the identification issuing authority. For instance, the digital identification server 110 may initiate processes to enroll customers with the digital identification 132, and operate security protocols to detect potential fraudulent use or privacy breaches associated with the digital identifications. In some instances, the processes related to the digital identification 132, as described above, may be coordinated with the issuing authority server 120, to ensure that secure customer information that includes personally identifiable information are not exposed during the provisioning of the digital identification 132.

As described, secure customer information may refer to customer information within the digital identification 132 that may include personally identifiable information associated with the customer such as, for example, social security numbers, place of residence, and/or other demographic information that is associated with other types of information that the customer considers private. In addition, the secure customer information may include medical records of the customer that are protected under the Health Insurance Portability and Accountability Act of 1996 (HIPAA). Access to the secure customer information within the digital identification 132 may be restricted by associated the secure customer information to different line patterns and specifying the associations within the line pattern repository as described above.

The digital identification server 110 may exchange communications with the digital identification database 112, which includes customer information for enrolled customers and/or other configuration details related to the digital identification program. For instance, the digital identification database 112 may include a customer entry associated with a customer that includes account information associated with enrolled customers, and any type of customer information that may be provided by the customer during a digital identification enrollment process.

In some implementations, the digital identification database 112 may include customer entries for both customers that are enrolled in the digital identification program and potential customers that the digital identification server 110 has identified as customers that are likely to enroll in the digital identification program. For example, the digital identification database 112 may include a field that indicates whether a customer entry is associated with an enrolled customer or a potential customer. In such implementations, the digital identification database 112 may be accessed by the digital identification server 110 to retrieve customer information for the digital identification 132 associated with an enrolled customer, and customer information for a candidate customer in order to send an enrollment email that provides an enrollment code to the candidate customer.

In some implementations, the customer entry for enrolled customers may be automatically created by the digital identification server 110 within the digital identification database 112. In such implementations, the customer may submit an online enrollment form including a set of user fields for providing customer information. In response, the digital identification server 110 may initiate a computer-implemented procedure that automatically generates a customer entry for the customer in the digital identification database 112 and inserts the values submitted for the set of user fields as customer information that is included in the customer entry.

In some implementations, the digital identification server 110 may additionally exchange communications with an image server, which stores photographs associated with a customer identification card. In some implementations, the image server may be operated by a separate entity or organization that operates the digital identification server 110. For instance, in such implementations, the image server may be operated by the identification issuing authority. In other implementations, the image server may be operated by the authorized issuing authority that also operates the digital identification server 110. In such implementations, the image server may be a sub-component of the digital identification server 110.

The issuing authority server 120 may be a remote server that is operated by the issuing authority and used to control access to secure customer information that is included in physical identification cards issued by the issuing authority. For instance, the issuing authority server 120 may provide access to demographic information of customers, historical information associated with customers (e.g., previous identification cards issued, number of renewals, etc.), and/or other types of customer information using authorization procedures that require validation of access credentials. For example, upon receiving a request for the secure customer information by the digital identification server 110, the issuing authority server 120 may require an exchange of the access credentials to validate an authorized request.

The issuing authority server 120 may be queried by the digital identification server 110 for secure customer information during a digital identification operation. For instance, during an enrollment process, after a customer has opted to enroll into a digital identification program, the digital identification server 110 may query the issuing authority server 120 using a customer identifier number to extract secure customer information to be included in a generated digital identification 132. In another example, during a verification operation, the digital identification server 110 may access the issuing authority server 120 to determine whether a digital identification 132 for a customer includes false customer information indicative of a fraudulent digital identification 132.

In some implementations, the issuing authority server 120 may be configured with additional security protocols compared to the digital identification server 110 to protect sensitive customer information associated with the customer. For instance, in some instances, the issuing authority server 120 may be associated with a Federal government agency that manages nationwide programs that require specialized access (e.g., a government clearance). In such instances, the digital identification server 110 may be configured to access the secure customer information stored within the issuing authority server 120 under a special security agreement that ensures that the exchange of the secure customer information is controlled and regulated according to Federal privacy statutes. For example, the issuing authority server 120 may track information related to each exchange with the digital identification server 110 such that in the event that the digital identification server 110 determines that a particular digital identification 132 is invalid, a notification may be received by the issuing authority server 120 to take additional security measures to protect more sensitive customer information that may be associated with, but not included in, the digital identification 132. In this regard, the communication exchange between the digital identification server 110 and the issuing authority server 120 may be utilized to ensure protection of customer information beyond the customer information included in the digital identification 132.

The customer device 130 may be a portable electronic computing device that displays the digital identification 132 associated with a customer. For instance, the customer device 130 may be, for example, a smart phone, a tablet computer, a laptop computer, a personal digital assistant device, an electronic pad, a smart watch, a smart glass, or any electronic device with a display that is connected to a network.

The customer device 130 exchanges communications with the digital identification server 110 to receive and transmit enrollment information related to the digital identification program, customer data that is included in the digital identification, credential data used to verify the authenticity of the digital identification 132, and/or configuration settings that adjust the display of the digital identification 132 on the customer device 130. For example, during an online enrollment process, the customer may use the customer device 130 to input customer information and an assigned access code for the digital identification program, which is then transmitted to the digital identification server 110 to generate the digital identification 132. In another example, during a verification process, when the digital identification 132 is enabled on the customer device 130, a data packet including credential data may be transmitted to the digital identification server 110 to determine whether the digital identification 132 is still valid or includes accurate information. In this example, if the digital identification server 110 determines that the credential data is valid, then the digital identification may be determined to be valid. Alternatively, if the digital identification server 110 determines that the credential data is not valid, then the digital identification 132 may be determined to be invalid.

In some implementations, the customer device 130 may include a mobile application that exchanges communications to the digital identification server 110 as an application server. For example, the mobile application may be associated with a customer account that is stored on the digital identification database 112. In addition, the mobile application may periodically exchange information related to the security status assigned by the digital identification server 110 to determine whether the digital identification 132 is valid. In some instances, the mobile application may additionally or alternatively include various displays of the digital application such that the mobile application may be used as a replacement form of identification to a physical identification card.

The digital identification 132 may be displayed on a user interface on the customer device 130. For example, as shown in FIG. 1A, the digital identification 132 may include a photograph of a customer, a customer identifier, categorical data (e.g., identification classification), demographic information (e.g., sex, height, eye color, home address), date of birth, etc.), and issuance information associated with a corresponding physical identification card. In some instances, the digital identification may be a digital image of the corresponding physical identification card. In such implementations, the appearance of the digital identification may be substantially similar to the physical identification and consequently used as a duplicate form of identification.

Figure 2:
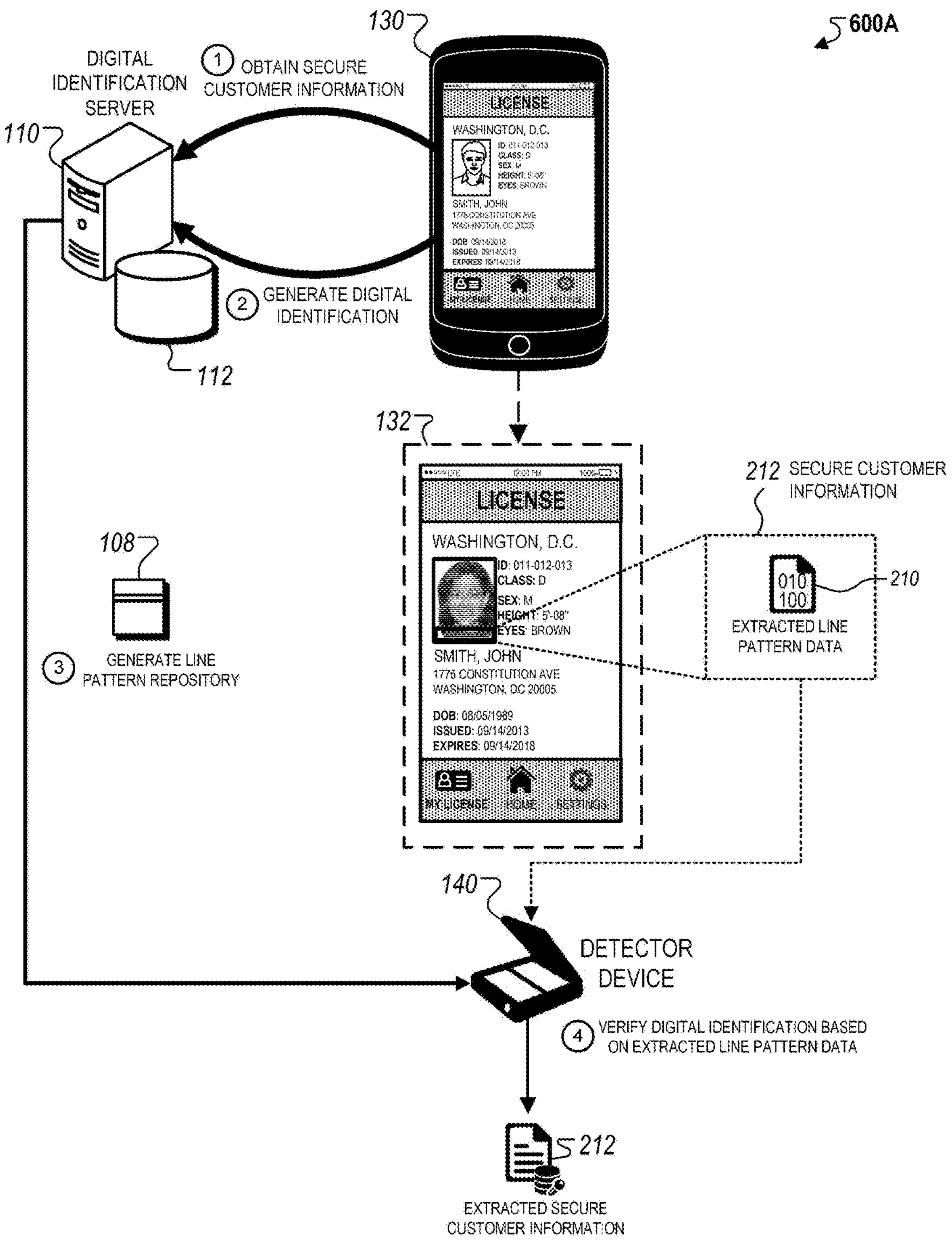
FIG. 2 illustrates an example of a system for verifying a digital identification based on data extracted from embedded line patterns of the digital identification.

FIG. 2 illustrates an example of a system 200 for verifying a digital identification based on data extracted from embedded line patterns of the digital identification 132. Although FIG. 2 illustrates a system that extracts data from a digital identification, similar systems and techniques can also be employed for a physical identification card such as the identification 102 depicted in FIG. 1A.

In step (1), the digital identification server 110 initially obtains secure customer information using different techniques. In some instances, the secure customer information may be obtained during the enrollment process when the customer is requested to verify his identity by providing personally identifiable information (e.g., social security number, user authentication information, etc.). The obtained customer information can then be stored and associated with designated line patterns. Additionally or alternatively, the secure customer information can also be obtained from an electronic database of a verified source such as the issuing authority. For example, during the enrollment process for obtaining a digital driver license, the digital identification server 110 may obtain secure customer information associated with a customer record within the state department of motor vehicle database. In this example, the secure customer information can represent vehicle identification numbers that are currently registered with the customer record, among other types of personally identifiable information.

In step (2), the digital identification server 110 then generates the digital identification 132 for a customer of the customer device 130 based on the obtained secure customer information. For example, as described in more detail below with respect to FIG. 5, the digital identification server 110 includes a modified photographic image embedding line patterns into the digital identification 132. An example of the modified photographic image is the customer photograph 104 illustrated in FIG. 1A. The digital identification 132 is then issued and accessible by the customer on the customer device 130.

In step (3), once the digital identification 132 is generated, the digital identification server 132 also generates the line pattern repository 108 illustrated in FIG. 1A. As discussed above, the line pattern repository 108 maps specific line patterns that are embedded within the digital identification 132 to pieces of secure information obtained by the digital identification server 110 during the generation of the digital identification server 110. The line pattern repository 108 thus enables the identification of a corresponding piece of secure customer information based upon the detection of an embedded line pattern within the digital identification 132. The line pattern repository 108 may be stored in the digital identification database 112, and subsequently transmitted to authorized devices that perform verification of the digital identification 132 such as a detector device 140.

In step (4), during a verification operation of the digital identification 132, the detector device 140 initially extracts line pattern data 212 within the digital identification 132. This can be accomplished using various types of optical recognition techniques. For instance, the detector device 140 can be configured to recognize designated line patterns that are included within the line pattern repository 108.

During a scan of the digital identification 132, the detector device 140 may identify the presence of the designated line patterns, and extract the identified line patterns as the extracted line pattern data 212. The extracted line pattern data 212 may specify, for example, a list of line patterns detected within the digital identifications, and a set of associated information for each detected line pattern. For example, the line pattern data 212 may specify a coordinate location within the digital identification where a particular line pattern was detected. In another example, the line pattern data 212 may specify the particular photographic image of the digital identification 132 that included the detected line pattern. In both of these examples, the associated information can be used to distinguish between true line pattern detection and false positive line pattern detection by the detector device 140.

The detector device 140 can then determine the secure customer information 212 assigned to the extracted line pattern data 210 using the information specified within the line pattern repository 108. For instance, the detector device 140 may cross-reference each of the detected line patterns indicated by the extracted line pattern data 210 with the line patterns that are specified within the line pattern repository 108 in order to determine the pieces of customer information assigned to each line pattern. As an example, referring back to FIG. 1A, the detection of the line pattern 106*a* within the digital identification 132 would enable the detector device 140 to obtain a verified social security number that is stored in the line pattern repository 108.

As described throughout, the detector device 140 can use both the extracted line pattern data 210 and the extracted secure customer information 212 to perform various types of verification operations of the digital identification 132. In one example, the detected line patterns within the extracted line pattern data 210 can be cross-referenced against a list of verified line patterns specified by the line pattern repository 108 in order to determine the authenticity of the digital identification 132. In this example, if the extracted line pattern data 210 does not include one or more of the verified line patterns, then detector device 140 may determine that there is a likelihood that the digital identification 132 is a counterfeit.

In another example, the arrangement of detected line patterns within the digital identification 132 can also be cross-referenced against a verified arrangement specified by the line pattern repository 108. In this example, the detector device 140 may determine that the digital identification 132 may be a counterfeit even if all of the verified line patterns are detected but in an incorrect arrangement. In each of these examples, the sensitivity of counterfeit detection can be adjusted based on the quality of the digital identification (e.g., image resolution), the scanning and/or recognition capabilities of the detector device, or other aspects that may impact the detection of the line patterns. In addition, the sensitivity of counterfeit detection may also be adjusted based on the type of verification operation performed.

In some implementations, the extracted secure customer information 212 can be used to authenticate a customer during an electronic transaction in which the customer provides the digital identification 132 as an authentication document. In such implementations, the extracted secure customer information 212 is used to verify a customer identity associated with the digital identification 132. For instance, because the line patterns encode customer information that is not displayed on the digital identification 132, detection of line patterns enables the detector device 140 to obtain additional customer information to verify a claimed customer identity of the digital identification 132.

As an example, during an online transaction, a customer provides the digital identification 132 for authenticating a claimed customer identity. In response, the detector device 140 obtains customer information displayed on digital identification 132 to identify the claimed customer identity. The detector device 140 scans the digital identification 132 to extract the line pattern data 210. The detector device 140 then identifies the secure customer information 212 assigned to the detected line patterns using the information specified by the line pattern repository 108. The detector device 140 finally verifies the claimed customer identity based on using the secure customer information 212 to verify the authenticity of the digital identification 132.

Figure 3:
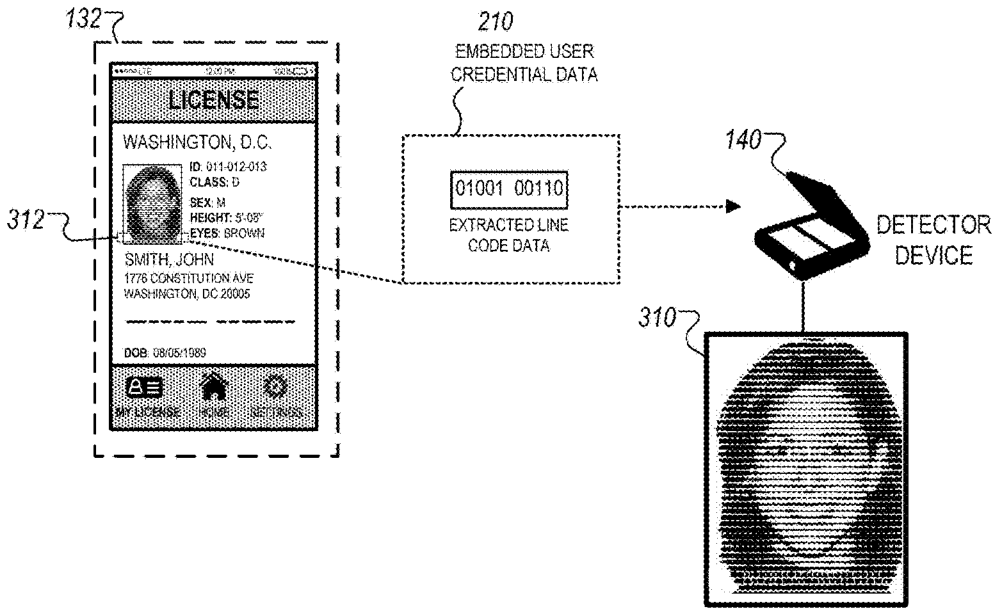
FIG. 3 illustrates an example of a table including examples of encoded credential data and a facial template viewable by a detector device based on extraction of at least one encoded credential data.

FIG. 3 illustrates a table 300 including example encoded credential data and a facial template 310 viewable by detector device 140. Table 300 includes encoded data 302, binary data 304, and line code data 306. As shown, encoded data 302 is data generally viewable within digital identification 132. Table 300 includes multiple distinct encoded data items that collectively are referred to herein as encoded data 302. Encoded data 302 includes data such as decimal values and alphanumeric values. In some implementations, the decimal values and alphanumeric values can be combined, arranged, or generally used to indicate an individual's name, age, gender, date of birth, address, identification number, and identification class.

In some alternative implementations, digital identification 132, and a corresponding physical identification (e.g., an identification card), can include embedded line pattern data that encodes a facial template of the cardholder or customer. In some instances, the decimal values and alphanumeric values can also be used to generate data 308 that corresponds to a particular facial template 310. As shown, the facial template associated with the embedded line pattern data can be consistent with, or substantially similar to, a photographic image of the customer/identification owner of digital identification 132. As described in more detail below, encoded data 308 (i.e., binary and line code data) can correspond to facial template 310.

In general, table 300 depicts example line code (line patterns/segments) that can be used to encode numerical values and alphabetical characters. In various implementations, the thickness of the lines depicted in the example line code 306 can vary depending on the type of information being embedded within an example identification. With regard to static lines (non-line code) that are used to create an image/card data depicted on an identification item, the various portions of line code 306 will not be a part of the lines used to depict card data. Instead example line code 306 will be embedded as line code within a background pattern of the identification item.

Table 300 includes multiple distinct binary data code sequences that collectively are referred to herein as binary data 304. Binary data 304 includes computer readable code sequences that a processing unit of a computing device can receive and process to extract or obtain encoded data 302. As shown in table 300, unique binary code sequences can correspond to certain encoded data. For example, a binary sequence of "01001" can correspond to the letter "A," thus, various binary sequences can be arranged to indicate the name of the identification card owner. In another example, a binary sequence of "00110" can correspond to the numerical value "3," thus, one or more binary sequences corresponding to numerical values can be arranged to indicate the age of the identification card owner.

The binary data sequences shown in FIG. 3 represent example 5-bit binary data sequences. In some implementations, more or fewer bits can be used to represent a variety of different encoded data for a particular cardholder. For example, data 308 can include a 10-bit binary code sequence that corresponds to encoded data for generating facial template 310. In some implementations, more than 10-bits can be used to encode and generate facial template 310 or fewer than 10-bits can be used to encode and generate facial template 310.

Table 300 includes multiple distinctive line patterns that collectively are referred to herein as line code data 306. As described above, line patterns can be formed using line segment sequences in which certain line segments include different line lengths and/or thicknesses relative to other line segments. As shown in FIG. 3, legend 314 indicates that longer line segments correspond to a bit value of "1" while shorter line segments correspond to a bit value of "0." Moreover, spacing between line segment pairs can vary as well. For example, for line patterns that include multiple line segment pairs, the spacing between line segments of a first line segment pair can be different from the spacing between line segments of a second line segment pair.

As shown in table 300, unique line code data can correspond to certain encoded cardholder data. For example, a line pattern that includes "--—-—" can correspond to a decimal value of 2, while a line pattern that includes "--—--" can correspond to a decimal value of 3. Hence, in some implementations, the aforementioned line segments can be scanned and decoded to indicate the age (e.g., 23) of the identification card owner. In some implementations, line patterns shown in FIG. 3 represent only a portion of longer line patterns that may, for example, extend horizontally from left to right at various sections of digital identification 132 or is corresponding physical card equivalent.

In some implementations, longer or shorter line pattern portions can be used to represent a variety of different encoded data for a particular cardholder. For example, data 308 can include a line pattern portion that corresponds to encoded data for generating facial template 310. As shown, in some implementations, a longer line pattern can be used to encode and generate facial template 310 relative to the line pattern portions for other encoded data associated with digital identification 132.

In some implementations, physical or digital identifications can include line patterns with line segments that have a thickness of approximately 7.5-micron. In other implementations, line segment thicknesses can be greater than or less than 7.5-microns. In general, the lengths or spaces between the line segments can be varied as needed depending, at least in part, on the amount of data that is to be encoded by a particular line pattern.

In some implementations, line patterns with line segments that have an approximate thickness of 7.5-micron can be combined with related sets of offset print lines. The related offset print lines can have a thickness that corresponds to the thickness of the line patterns (e.g., approximately 7.5-micron) used to encode certain cardholder data. In some instances, offset lines of corresponding thickness can be preprinted in a background image of an example identification.

In some implementations, line segments used to encode certain sensitive information can be disposed or placed within an identification in an alternating pattern relative to other print lines. Example placement patterns can include every third print line viewable on the identification being composed of line pattern segments that have a thickness corresponding to, or consistent with, the offset print lines. In alternative implementations, to enhance viewing clarity and improve authentication processes, line pattern segments can have a slightly larger thickness relative to preprinted background lines. Line pattern segments can be also be printed or otherwise disposed in the identification using a variety of colors to also aid in enhancing viewing clarity.

As described above, in some implementations, detector device 140 can be configured to scan digital identification 132 and the line patterns embedded within the digital identification 132 to extract one or more secure user customer information. In FIG. 3, detector device 140 scans digital identification 132 to extract the line pattern data 210. As shown, digital identification 132 can include an example line pattern 312 embedded with the digital identification 132 (or a physical card). In some instances, encoded line data can be decoded, in part, by scanning or capturing an image of an example identification (e.g., digital identification 132) with a computing device such as a smartphone, a digital camera, or a laptop computing device.

In the implementation shown in the FIG. 3, line pattern 312 corresponds to encoded data that can be scanned and used to generate an example binary data sequence that includes "01001 00110" (more bits, e.g., 1-bit to 1,000 bits). The example binary data sequence can then be processed by a processing unit of, for example, detector device 140 to generate an image of the card owner in the form of facial template 310 (viewable on a display screen of device 140). Thus, line patterns embedded within an identification can be scanned to extract and process encoded data to generate facial template 310 to provide enhanced identification verification.

Figure 4:
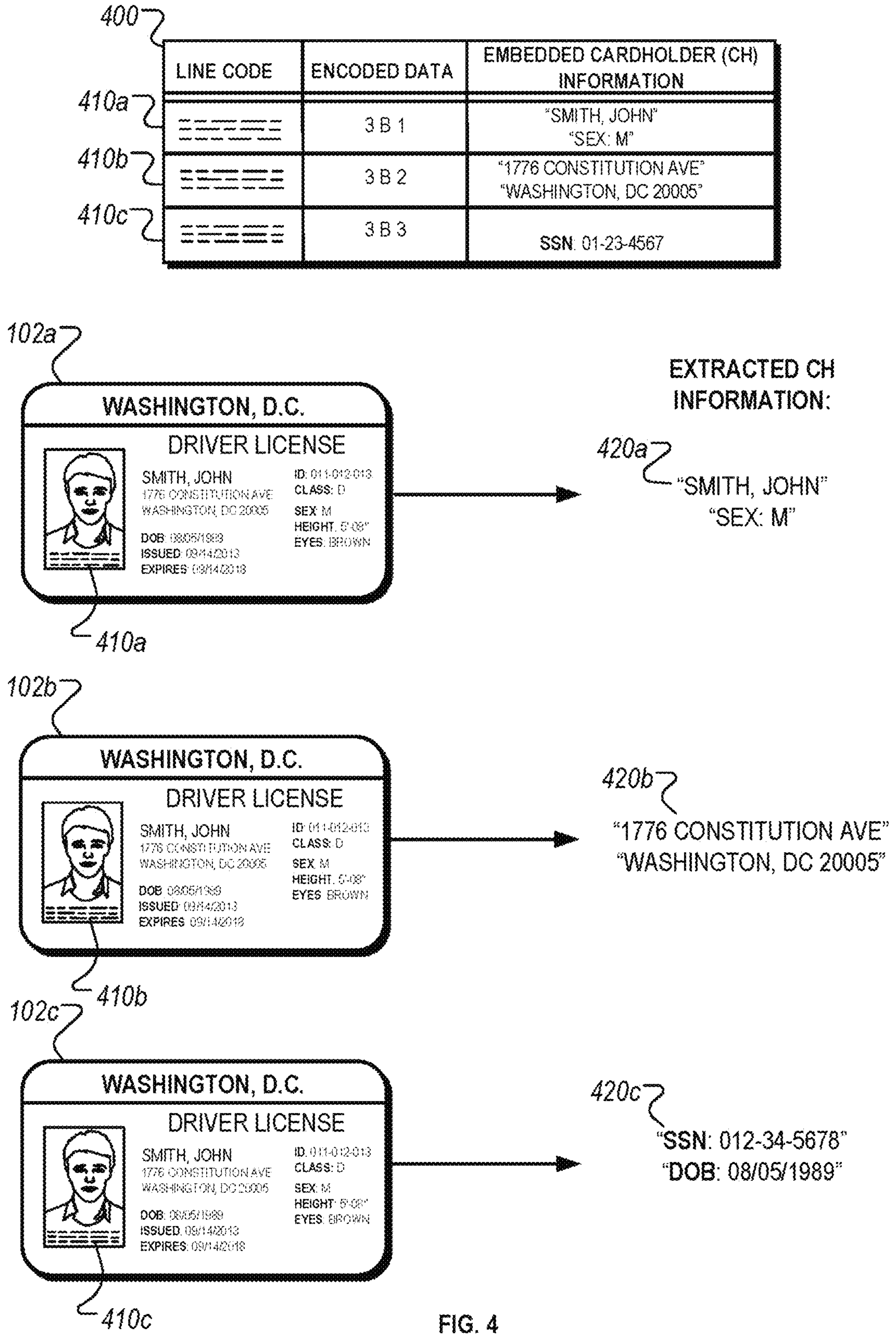
FIG. 4 illustrates examples of decoded credential data that can be extracted from sets of encoded data.

FIG. 4 illustrates example decoded/detected credential data that can be extracted from examples of encoded line pattern data. FIG. 4 includes table 400, identification 102*a/b/c* (e.g., a card or article), line pattern features 410*a/b/c* and extracted data 420*a/b/c*. In some implementations, line pattern feature 410*a* can be extracted using, for example, detector device 140. As indicated above, detector device 140 can include a screen configured to display, to a user, the encoded data that corresponds to line pattern feature 410*a*. In one implementation, upon extraction of line code associated with feature 410*a*, a user of detector device 140 can view, on the display screen of device 140, embedded cardholder information corresponding to, for example, the name and gender/sex of the cardholder. Additionally, embedded cardholder information corresponding to address information and social security number can be displayed by device 140 in response to extraction of line code associated with features 410*b* and 410*c* respectively.

As shown in FIG. 3, in one implementation, a detector device 140 can scan identification 102*a* to extract encoded data 420*a* associated with line pattern feature 410*a*. The extracted encoded data 420*a* can include the name of the cardholder and the gender of the cardholder. In another implementation, detector device 140 scans identification 102*b* to extract encoded data associated with line pattern feature 410*b*. The extracted encoded data 420*b* can include the first line of the cardholder's address and the second line of the cardholder's address. In yet another implementation, detector device 140 scans identification 102*c* to extract encoded data associated with line pattern feature 410*c*. The extracted encoded data 420*c* can include the cardholder's social security number and/or the cardholder's date of birth.

In some implementations, identification cards (e.g., physical cards) having a primary photographic image can also include a partial density ghost feature (not shown) in an area of the card that is distinct from the area having the photographic image of the card owner. In an aspect of this implementation, a card designer can include an outline (not shown) around the example ghost feature. The, outline can be composed of line patterns including multiple line segments that can be used to encode sensitive customer/cardholder data.

In another aspect, the outline can include an irregular outline shape or design. In yet another aspect, the outline can include a square shape, a rectangular shape, a circular shape, a triangular shape, or any other shaped desired by the card designer. In the various aspects discussed above, the shape of the outline can be constructed with line patterns including line segments that are uniquely arranged to embed and encode data within an example identification card such as card 102*a/b/c*.

In general, line patterns embedded within an example physical or digital identification (e.g., card or displayed image on a device) can be formed using a series of lines that create the appearance of a wave going across the face of the identification. For physical cards, ink jet printers, ultraviolet (UV) laser printers, YAG laser printers, or any other suitable print device can be used to produce the embedded line patterns described in this specification.

In some implementations, printer devices can be configured such that an offset print pattern can include spacing between lines used to generate readable larger print information typically viewable on an identification (e.g., card owner name, address, data of birth (DOB), etc.). The spacing between the lines used to generate readable print can be sufficient such that embedded line patterns that encode certain formation can be sized small enough to fit between the line spaces created by the offset print pattern.

In some examples, with regard to physical identification cards, an identification card designer can utilize a YAG laser to embed one or more lines between, for example, the colored or non-colored lines associated with the standard text/print of an identification card. This example card can already include a photograph of the card owner as well as the card owner's demographic information. Embedded line pattern data would then be included on top of, for example, a pre-printed background information associated with the identification.

When embedded within the standard text/print information of the identification card, the line segments of the encoded line pattern data can be interspersed with and cooperate with the standard text/print line data to create the appearance of a wave pattern. Some identification cards can be printed using dies that have certain see-through attributes. Thus, in some implementations, the embedded line pattern data may be viewable on the background of an example physical identification card.

Figure 5:
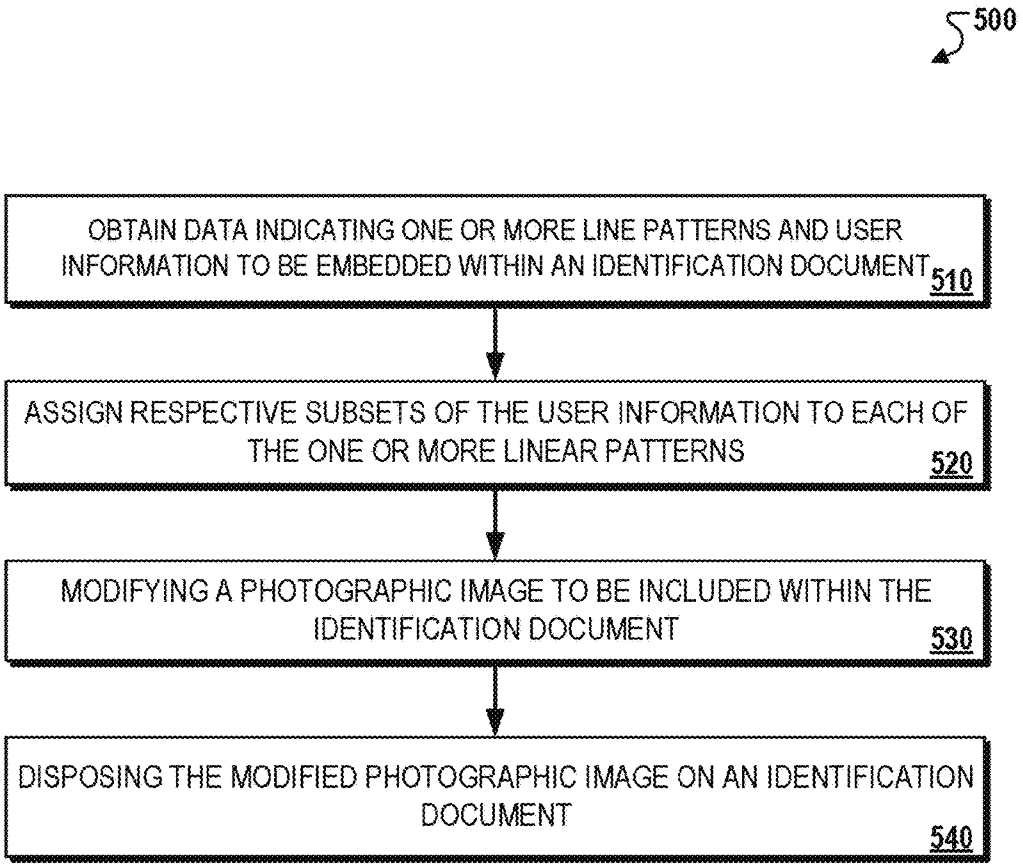
FIG. 5 illustrates an example of a process for embedding line patterns in an image on the identification document.

FIG. 5 illustrates an example of a process 500 for embedding line patterns on an identification document. Briefly, the process 500 can include obtaining data indicating one or more line patterns and customer information to be embedded within an identification document (510), assigning respective subsets of the customer information to each of the one or more line patterns (520), modifying a photographic image to be included within the identification document (530), and disposing the modified photographic image on an identification document (540).

In more detail, the process 500 can include obtaining data indicating one or more line patterns and customer information to be embedded within an identification document (510). For instance, the digital identification server 110 may obtain data indicating one or more line patterns and data indicating customer information embedded within an identification document from the digital identification database 112. As described above, in some instances, this information can be specified within the line pattern repository 108 generated for a customer during an issuance process by the issuing authority.

The identification document can either be a physical identification card to be issued to a customer or a digital identification card to be issued to a customer enrolled in a digital identification program. In some instances, the customer information to be embedded within the identification document can include secure customer information used to authenticate a customer using the identification document without displaying the information on the identification document (e.g., social security number). In other instances, the customer information to be embedded may additionally or alternatively include secure customer information used to verify the authenticity of the identification document.

The process 500 can include assigning respective subsets of the customer information to each of the one or more line patterns (520). For instance, the digital identification server 110 may assign portions of the customer information to be embedded within the identification document to each of the one or more line patterns. For example, the digital identification server 110 may assign each distinctive line pattern (e.g., the line patterns 106*a-c* depicted in FIG. 1) to a portion of the customer information such that the detection of a particular line pattern within the identification document can be used to identify the corresponding portion of customer information based on using the line pattern repository 108. For example, as depicted in FIG. 1A, a scanner can identify a verified social security number for a customer based on detecting the line pattern 106*a* within the identification 102 and cross-referencing the detected line pattern within the line pattern repository 108.

The process 500 can include modifying a photographic image to be included within the identification document (530). For instance, the digital identification server 110 may modify the customer photograph 104 to be included within the identification 102. In some instances, the modification may include adjusting line segments of an existing customer photograph stored within the digital identification database 112. For example, line segments in specified regions of the customer photograph may be selected and adjusted using the line patterns identified within the line pattern repository 108. In other instances, instead of modifying an existing customer photograph, the digital identification server 110 may instead generate a new customer photograph that includes regions with embedded line patterns. For example, dark regions of the customer photograph can include line segments with larger thicknesses and/or smaller spacing distances between line segments, and lighter regions of the customer photograph can include line segments with smaller thicknesses and/or larger spacing distances. In this example, the customer photograph can be constructed entirely of designated line patterns that each encode customer information.

As described above, in other implementations, the photographic image can include other types of features that are included within the identification 102 (e.g., background patterns, portions of text, issuing authority logos, etc.). In this regard, the digital identifications server 110 can adjust other types of elements included within an identification document besides the customer photograph.

As depicted in FIG. 1A, the modified photographic image (e.g., the customer photograph 104) includes regions where line patterns are embedded. In some implementations, the line patterns are invisible to the human eye such that there are no visible differences between an unmodified version of the photographic image (e.g., a customer photograph captured through a camera) and a modified version of the photographic image (e.g., a customer photograph with lines modified to encompass the line patterns). This can be accomplished by either adjusting line thickness or adjusting spacing distance between line segments such that the modified line patterns are not visible to the human eye, but detectable using machine-readable optical recognition techniques. As described above, this improves the security of the identification 102 by providing an additional verification layer for determining the authenticity of the identification 102.

The process 500 can include disposing the modified photographic image on an identification document (540). For instance, instructions to include the modified photographic image with embedded line patterns within an identification document can be transmitted to the appropriate device. In the case of physical identification cards such as the identification 102) the modified photographic image can be printed onto a physical card using high precision lasers to print the line patterns onto a surface. Alternatively, in the case of digital identifications such as the digital identification 132, the modified photographic image can be included within an electronic file corresponding to the digital identification (e.g., a digital image). In the first example, the digital identification server 110 may generate printing instructions indicating where the line segments are to be embedded within the modified photographic image of the identification document. In the second example, the digital identification server 110 may instead generate a new digital identification file that includes the modified photographic image.

As described throughout, computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. An identification document comprising:
- a photographic image of an individual associated with the identification document;
- one or more line patterns included in the photographic image to depict physical features of the individuals, each of the one or more line patterns comprising:
  - a plurality of discrete line segments that cooperate to form an outline of a portion of a physical feature of the individual; and
  - each discrete line segment being configured to encode data about identifying features of the individual; and
- identifying information printed on the identification document, the identifying information comprising a subset of information that is assigned to at least one of the one or more line patterns.

2. The identification document of claim 1, wherein each of the one or more line patterns comprise:
- a first line segment having a first thickness to encode a first type of data about a first identifying feature of the individual; and
- a second line segment having a second thickness to encode a second type of data about a second identifying feature of the individual, wherein the second thickness is greater than the first thickness of the first line segment.

3. The identification document of claim 1, wherein each of the one or more line patterns comprise:
- a first line segment having a dashed line pattern with a first spacing distance; and
- a second line segment having a dashed line pattern with a second spacing distance greater than the first spacing distance.

4. The identification document of claim 1, wherein each of the one or more line patterns comprise:
- a first line segment having a dashed line pattern; and
- a second line segment having a solid line pattern.

5. The identification document of claim 1, wherein the identifying information comprises secure identifying information for verifying the authenticity of the identification document.

6. The identification document of claim 1, wherein the photographic image is a dithered monochrome image comprising a plurality of lines to identify the individual associated with the identification document.

7. The identification document of claim 1, wherein each of the one or more line patterns are assigned to different subsets of the identifying information printed on the identification document.

8. The method of claim 1, wherein a line segment of a line pattern corresponds to binary data configured to be interpreted by a processing unit of a detector device.

9. A computer-implemented method comprising:
- obtaining (i) data indicating one or more line patterns, and (ii) data indicating identifying information to be encoded on an identification document;
- assigning a subset of the identifying information to at least one of the one or more line patterns;
- modifying a photographic image of an individual associated with the identification document by integrating the one or more line patterns in the photographic image, each of the one or more line patterns being used to depict physical features of the individuals and encode data about identifying features of the individual; and
- generating the identification document using the modified photographic image and the data indicating the identifying information, wherein the identifying information is printed on the identification document.

10. The method of claim 9, wherein each of the one or more line patterns comprise:
- a first line segment having a first thickness to encode a first type of data about a first identifying featured of the individual; and
- a second line segment having a second thickness to encode a second type of data about a second identifying feature of the individual, wherein the second thickness is greater than the first thickness of the first line segment.

11. The method of claim 9, wherein each of the one or more line patterns comprises:
- a first line segment having a dashed line pattern with a first spacing distance; and
- a second line segment having a dashed line pattern with a second spacing distance greater than the first spacing distance.

12. The method of claim 9, further comprising:

obtaining, from a customer device, data about a claimed identification document that corresponds to the generated identification document;

based on the received data, identifying a customer identity associated with the claimed identification document;

obtaining verification data for the customer identity to determine authenticity of the claimed identification document, the verification data indicating one or more line patterns associated with a valid identification document for the customer identity; and determining authenticity of the claimed identification document based on the received data about the claimed identification document, and the obtained verification data for the customer identity.

13. The method of claim 12, wherein determining authenticity of the claimed identification document comprises:

determining that the claimed identification document does not include at least one of the one or more line patterns associated with the valid identification document; and in response to determining that the claimed identification document does not include at least one of the one or more line patterns associated with the valid identification document, determining that the claimed identification document is not valid or not authentic.

14. The method of claim 12, wherein:

the obtained verification data indicates a specific arrangement of line patterns that are associated with the valid identification document, and determining authenticity of the claimed identification document comprises:

determining that a specific arrangement of line patterns included on the claimed identification document matches the specific arrangement of line patterns that are associated with the valid identification document.

15. The method of claim 9, wherein:

modifying the photographic image comprises adjusting a visible line that defines a particular physical feature of the individual associated with the identification document, the visible line is adjusted to integrated a plurality of line segments that form specific line pattern along the visible line, and the plurality of line segments are invisible to the human eye.

16. The method of claim 9, wherein each of the one or more line patterns comprises:

a plurality of discrete line segments that cooperate to form an outline of a portion of a physical feature of the individual; and each discrete line segment is configured to encode data about identifying features of the individual.

17. A system comprising:

one or more processing devices; and one or more non-transitory machine-readable storage devices storing instructions that are executable by the one or more processing devices to cause performance of operations comprising:

obtaining (i) data indicating one or more line patterns, and (ii) data indicating identifying information to be encoded on an identification document;

assigning a subset of the identifying information to at least one of the one or more line patterns;

modifying a photographic image of an individual associated with the identification document by integrating the one or more line patterns in the photographic image to depict physical features of the individual, each of the one or more line patterns comprising:

a plurality of discrete line segments that cooperate to form an outline of a portion of a physical feature of the individual; and each discrete line segment is configured to encode data about identifying features of the individual; and generating the identification document using the modified photographic image and the data indicating the identifying information, wherein the identifying information is printed on the identification document.

18. The system of claim 17, wherein each of the one or more line patterns comprises:

a first line segment having a first thickness to encode a first type of data about a first identifying feature of the individual; and a second line segment having a second thickness to encode a second type of data about a second identifying feature of the individual, wherein the second thickness is greater than the first thickness of the first line segment.

19. The system of claim 17, wherein each of the one or more line patterns comprises:

a first line segment having a dashed line pattern with a first spacing distance; and a second line segment having a dashed line pattern with a second spacing distance greater than the first spacing distance.

20. The system of claim 17, further comprising:

obtaining, from a customer device, data about a claimed identification document that corresponds to the generated identification document;

based on the received data, identifying a customer identity associated with the claimed identification document;

obtaining verification data for the customer identity to determine authenticity of the claimed identification documents, the verification data indicating one or more line patterns associated with a valid identification document for the customer identity; and determining authenticity of the claimed identification document based on the received data about the claimed identification document, and the obtained verification data for the customer identity.

* * * * *